US011297785B2

(12) United States Patent
Aughton et al.

(10) Patent No.: US 11,297,785 B2
(45) Date of Patent: Apr. 12, 2022

(54) METHOD AND SYSTEM FOR WATER DISTRIBUTION AND SOIL MOISTURE DETERMINATION

(71) Applicants: RUBICON RESEARCH PTY LTD, Hawthorn East (AU); THE UNIVERSITY OF MELBOURNE, Parkville (AU)

(72) Inventors: David John Aughton, Hawthorn East (AU); Sumith Choy, Viewbank (AU); Iven Michiel Yvonne Mareels, Parkville (AU); Dongryeol Ryu, Parkville (AU); Andrew Western, Parkville (AU)

(73) Assignees: RUBICON RESEARCH PTY LTD, Hawthorn East (AU); THE UNIVERSITY OF MELBOURNE, Parkville (AU)

( * ) Notice: Subject to any disclaimer, the term of this patent is extended or adjusted under 35 U.S.C. 154(b) by 126 days.

(21) Appl. No.: 16/639,418

(22) PCT Filed: Aug. 14, 2018

(86) PCT No.: PCT/AU2018/050858
§ 371 (c)(1),
(2) Date: Feb. 14, 2020

(87) PCT Pub. No.: WO2019/033158
PCT Pub. Date: Feb. 21, 2019

(65) Prior Publication Data
US 2021/0127605 A1  May 6, 2021

(30) Foreign Application Priority Data

Aug. 14, 2017 (AU) .................................. 2017903250
May 8, 2018 (AU) .................................. 2018901564

(51) Int. Cl.
*A01G 25/16* (2006.01)
*G05B 15/02* (2006.01)
(Continued)

(52) U.S. Cl.
CPC ......... *A01G 25/167* (2013.01); *G01N 27/048* (2013.01); *G05B 15/02* (2013.01); *H04L 67/12* (2013.01); *G05B 2219/2625* (2013.01)

(58) Field of Classification Search
CPC ...... A01G 25/167; A01G 25/16; Y02A 40/10; Y02A 40/22; Y02A 90/10; A01B 79/005;
(Continued)

(56) References Cited

U.S. PATENT DOCUMENTS

2003/0109964 A1* 6/2003 Addink .................. A01G 25/16
                                                              700/284
2010/0222932 A1* 9/2010 O'Connor ................. E03B 7/02
                                                              700/284
(Continued)

FOREIGN PATENT DOCUMENTS

WO  2002016698 A1  2/2002
WO  2002071163 A1  9/2002
(Continued)

OTHER PUBLICATIONS

Extended European Search Report and Written Opinion dated Mar. 30, 2021 for related European Application No. 18846094.3.
(Continued)

*Primary Examiner* — Darrin D Dunn
(74) *Attorney, Agent, or Firm* — David D. Brush; Westman, Champlin & Koehler, P.A.

(57) ABSTRACT

A method of spatially deriving soil moisture at a selected location within an irrigation district to be irrigated. The method includes using system identification techniques to produce an algorithm for evapotranspiration based on a
(Continued)

US 11,297,785 B2
Page 2 predetermined selection from the following measured parameters: solar radiation spectrum, wind speed, temperature, humidity, crop factor, soil type, barometric pressure, irrigation historical data, and energy measurement from solar panels at each of a plurality of representative locations; calibrating the algorithm by direct measurement of the moisture in the soil at each of the representative locations by respective soil moisture sensors; and using measured parameters of rainfall, soil type, irrigation historical data and crop factor with the algorithm to derive or interpolate soil moisture at the selected location within the irrigation district.

21 Claims, 6 Drawing Sheets

(51) Int. Cl.
   *G01N 27/04* (2006.01)
   *H04L 29/08* (2006.01)
   *H04L 67/12* (2022.01)

(58) Field of Classification Search
   CPC ............... G05B 17/02; G05B 19/042; G05B 2219/23005; G05B 2219/2625
   See application file for complete search history.

(56) References Cited

U.S. PATENT DOCUMENTS

| | | | |
|---|---|---|---|
| 2012/0029709 A1* | 2/2012 | Safreno | A01G 25/16 700/284 |
| 2012/0261486 A1 | 10/2012 | Sarver et al. | |
| 2015/0272017 A1 | 10/2015 | Hedley et al. | |
| 2015/0347647 A1* | 12/2015 | Osborne | B09C 1/002 703/6 |
| 2015/0370935 A1* | 12/2015 | Starr | G06Q 50/02 703/11 |
| 2016/0048135 A1 | 2/2016 | Hill | |
| 2016/0088807 A1 | 3/2016 | Bermudez Rodriguez et al. | |
| 2016/0255763 A1* | 9/2016 | Canyon | A01B 79/005 |
| 2017/0038749 A1* | 2/2017 | Mewes | G05B 19/042 |
| 2017/0061052 A1* | 3/2017 | Gates | A01G 25/167 |
| 2017/0311559 A1* | 11/2017 | Ebert | G05D 22/02 |
| 2018/0070537 A1* | 3/2018 | Vasilenko | A01G 7/045 |
| 2018/0129175 A1* | 5/2018 | Jennings | G06K 9/00657 |
| 2018/0164762 A1* | 6/2018 | Mewes | G05B 17/02 |
| 2018/0220600 A1* | 8/2018 | Russell | A01G 25/00 |
| 2018/0306914 A1* | 10/2018 | Chan | A01C 21/005 |
| 2019/0049422 A1* | 2/2019 | Niemann | G01W 1/00 |
| 2019/0230875 A1* | 8/2019 | Mewes | A01G 25/167 |
| 2020/0026250 A1* | 1/2020 | Jennings | B05B 12/12 |

FOREIGN PATENT DOCUMENTS

| | | |
|---|---|---|
| WO | 2013016769 A1 | 2/2013 |
| WO | 2013149304 A1 | 10/2013 |
| WO | 2015031954 A1 | 3/2015 |
| WO | 2016070195 A1 | 5/2016 |
| WO | 2017106962 A1 | 6/2017 |

OTHER PUBLICATIONS

Communication pursuant to Rules 70(2) and 70a (2) EPC dated Apr. 15, 2021, 2021 for related European Application Mo. 18846094.3.
English translation of the Russian Office Action dated Nov. 20, 2020 for Russian Application No. 202090498.
English translation of the Chinese Office Action dated Jun. 1, 2021 for Chinese Application No. 201880063978.9.
International Search Report dated Aug. 28, 2018 for corresponding International Application No. PCT/AU2018/050858, filed Aug. 14, 2018.
Written Opinion of the International Searching Authority dated Aug. 28, 2018 for corresponding International Application No. PCT/AU2018/050858, filed Aug. 14, 2018.
International Preliminary Report on Patentability dated Dec. 12, 2019 for corresponding International Application No. PCT/AU2018/050858, filed Aug. 14, 2018.
International-type search and written opinion for provisional patent application dated Jul. 13, 2018 from the Australian Patent Office for corresponding AU Application No. 2018901564.

\* cited by examiner

METHOD AND SYSTEM FOR WATER DISTRIBUTION AND SOIL MOISTURE DETERMINATION

CROSS-REFERENCE TO RELATED APPLICATIONS

This Application is a Section 371 National Stage Application of International Application No. PCT/AU2018/050858, filed Aug. 14, 2018, which is incorporated by reference in its entirety and published as WO 2019/033158 A1 on Feb. 21, 2019, not in English.

The present application claims priority from Australian Provisional Patent Application No. 2017903250 filed 14 Aug. 2017 and Australian Provisional Patent Application No. 2018901564 filed 8 May 2018, the entire contents of which are incorporated herein by reference.

FIELD

Some aspects of the present invention relate to methods and systems for irrigation and/or otherwise distributing water. Some of these methods and systems rely on estimates of soil moisture level. Other aspects of the invention relate to estimating soil moisture. Some of these other aspects rely on an indication of solar intensity. Further aspects of the invention relate to obtaining an indication of solar intensity.

The invention is described herein with reference to irrigation by way of example only. Other examples may be applied in other contexts, e.g. the disclosed water distribution methods may be applied to flood management. Likewise estimates of soil moisture and solar intensity may be useful for purposes other than water distribution.

BACKGROUND

Irrigation is typically the largest consumer of land based fresh water. It also contributes to largest amount of water wastage. Existing irrigation systems typically have a water delivery efficiency in the range of 35% to 50%. That is, in delivering water from a catchment, only less than half the volume of water delivered will reach its final destination.

In a typical irrigation system, around 30% of water is lost from a dam to a canal gate. The losses may be due to operating spills, poor measurement, leaks, seepage, and evaporation. From the gate to the farm, there is a further loss of 50% of water. The losses at this stage may be due to poor service, slow delivery, varying flows, and poor control. There are further water losses from the farm to the plants/crops, which may be due to imprecise timing of water delivery and lack of crop measurements (to determine whether or not a crop needs water). Typically, only 35% of water diverted from the catchment will reach the crop.

In addition, existing irrigation systems do not achieve consistent flow rates to the farms. Existing methods for calculating evapotranspiration (ET) make use of satellite data. The ET data obtained from these existing methods is however not accurate because of the separation between the field and the satellite.

Embodiments of the present invention seek to provide improvements in and for water distribution; soil moisture, ET estimation and/or solar intensity indication; or to at least provide the public with a useful choice.

It is not admitted that any of the information in this patent specification is common general knowledge, or that the person skilled in the art could be reasonably expected to ascertain or understand it, regard it as relevant, or combine it in any way before the priority date.

SUMMARY

According to an aspect, the present invention provides a method of spatially deriving the soil moisture at a selected location within an irrigation district to be irrigated, said method including the steps of:

using system identification techniques to produce an algorithm for evapotranspiration based on a predetermined selection from the following measured parameters: solar radiation spectrum, wind speed, temperature, humidity, crop factor, soil type, barometric pressure, irrigation historical data, and energy measurement from solar panels at each of a plurality of representative locations;

calibrating said algorithm by direct measurement of the moisture in the soil at each of said representative locations by respective soil moisture sensors; and using measured parameters of rainfall, soil type, irrigation historical data and crop factor with said algorithm to derive or interpolate soil moisture at said selected location within said irrigation district.

In an embodiment said soil type is determined by ground penetrating radar to develop a relationship between the radar signal and the water holding capacity of the soil.

In an embodiment said irrigation historical data is based on the time and volume of the irrigation to provide saturation data on said soil moisture and/or said solar radiation spectrum includes visible light and near-infrared light.

In a further embodiment there is further included an irrigation management system to irrigate predetermined areas of said irrigation district, said irrigation management system monitoring: said derived or interpolated soil moisture for said predetermined areas; availability of irrigation water to said predetermined areas; and requests for timed irrigation from end users for said predetermined areas; and allows requested irrigation to occur for said predetermined areas based on said monitoring.

In yet a further embodiment, said irrigation management system monitors an irrigation conveyance network from catchments to supply water to areas to be irrigated under demand by said end users. The irrigation management system monitors said soil moisture at said plurality of representative locations and monitors at least one or more of climate forecast, water orders from end users, crop details, water levels, and flow gate opening measurements of said irrigation district.

According to another aspect, the present invention provides a soil moisture determination system to spatially derive the soil moisture at a selected location within an irrigation district to be irrigated, said system including a networked computer system connected to a plurality of weather stations within said irrigation district to measure a selection from: solar radiation spectrum, wind speed, rainfall, temperature, humidity, barometric pressure, and energy measurement from solar panels at each of a plurality of representative locations, said networked computer system having data access to crop factor, soil type, and irrigation historical data at said representative locations, said networked computer system using system identification techniques to produce an algorithm for evapotranspiration based on a predetermined selection from the weather station measurements and the data access to crop factor, soil type, and irrigation historical data at said representative locations; said networked computer system calibrating said algorithm by direct measurement of the moisture in the soil at each of said representative locations by respective soil moisture sensors; and using measured parameters of rainfall, soil type, irrigation historical data and crop factor with said algorithm to derive or interpolate soil moisture at said selected location within said irrigation district.

In an embodiment, said soil type is determined by ground penetrating radar to develop a relationship between the radar signal and the water holding capacity of the soil. The irrigation historical data is based on the time and volume of the irrigation to provide saturation data on said soil moisture.

In a further embodiment, said solar radiation spectrum includes visible light and near-infrared light.

In yet another aspect of the invention there is provided an irrigation management system to irrigate predetermined areas of an irrigation district including the soil moisture determination system as previously defined, said irrigation management system monitoring: said derived or interpolated soil moisture for said predetermined areas; availability of irrigation water to said predetermined areas; and requests for timed irrigation from end users for said predetermined areas; and allows requested irrigation to occur for said predetermined areas based on said monitoring.

In an embodiment, said irrigation management system monitors an irrigation conveyance network from catchments to supply water to areas to be irrigated under demand by said end users. The irrigation management system monitors said soil moisture at said plurality of representative locations and monitors at least one or more of climate forecast, water orders from end users, crop details, water levels, and flow gate opening measurements of said irrigation district.

In yet a further embodiment said weather stations are included with a plurality of said flow gates.

According to an aspect, the present invention provides a method of controlling a water distribution system, the system having at least one at-least-predominantly-free-surface flow-path from which water is deliverable to soil; and the method including
controlling the system based on at least
a moisture level of the soil; and
at least one supply indicator, wherein the at least one supply indicator being an indicator of at least one of:
at least one volume of water in the system;
an inflow of water to the system; and
a future inflow of water to the system.

In an embodiment, the controlling includes causing water to be delivered to the soil to utilize a capacity of the soil to accept water at least one of a) in response to a surplus of water; and b) in anticipation of a surplus of water. The system preferably includes a system portion from which the water is so delivered. The method preferably includes reducing a volume of water in the system portion to make storage capacity within the system portion available to capture surplus water.

According to another aspect, the present invention provides a method of controlling a water distribution system, the system having at least one at-least-predominantly-free-surface flow-path; and the method including delivering water from the flow-path in accordance with a delivery schedule; receiving at least one supply indicator being an indicator of at least one of
at least one volume of water in the system;
an inflow of water to the system; and
a future inflow of water to the system; and
at least influencing the delivery schedule based on the at least one supply indicator.

In an embodiment, the flow path is at least 100 km long.

In an embodiment, the at least one supply indicator is an indicator of at least one of
at least one volume of water in the system upstream of the flow path;
an inflow of water to the system upstream of the flow path; and
a future inflow of water to the system upstream of the flow path.

In an embodiment, the controlling includes controlling a supply of water to the flow path.

According to another aspect, the present invention provides a method including utilizing as an indication of solar intensity an output of at least one photovoltaic powering a device.

In an embodiment, the device is an electromechanical device. The device may be one or more of a water control barrier, a pump, a flow meter and a water level sensor for example.

According to yet another aspect, the present invention provides a method of estimating at least one of a moisture level of soil and an evapotranspiration from the soil, the method including applying logic to an output of at least one photovoltaic powering a device.

In an embodiment, the device is an electromechanical device. The device may be one or more of a water control barrier, a pump, a flow meter and a water level sensor for example.

According to yet another aspect, the present invention provides a method, of estimating a spatially-variable estimate of soil moisture level across an agricultural area, including applying logic to data indicative of at least
air temperature;
rainfall;
wind speed;
relative humidity;
solar intensity; and
one inherent characteristic of the soil.

In an embodiment, the data is indicative of an irrigation history associated with the agricultural area.

In an embodiment, the data is indicative of air temperature at at least two points at least proximal the agricultural area.

In an embodiment, the data is indicative of rainfall at at least two points at least proximal the agricultural area.

In an embodiment, the data is indicative of wind speed at at least two points at least proximal the agricultural area.

In an embodiment, the data is indicative of relative humidity at at least two points at least proximal the agricultural area.

In an embodiment, the data is indicative of an energy density for visible light.

In an embodiment, the data is indicative of an energy density for near-infrared light.

In an embodiment, the data is indicative of the at least one inherent characteristic of the soil at at least two points at least proximal the agricultural area.

In an embodiment, the data includes an output from at least one soil-moisture sensor at least proximal the agricultural area.

According to another aspect, the present invention provides a method of estimating a spatially-variable estimate of soil moisture level across an agricultural area, the method including applying logic to data indicative of at least
an output from at least one soil-moisture sensor at least proximal the agricultural area; and
spatially-variable satellite data.

In an embodiment, the data is indicative of an energy density for visible light.

In an embodiment, the data is indicative of an energy density for near-infrared light.

In an embodiment, the method includes applying logic to an output of at least one photovoltaic powering a device. The device is preferably an electromechanical device. The device may be one or more of a water control barrier, a pump, a flow meter and a water level sensor for example.

In an embodiment, the applying logic is applying a model having parameters adjusted to suit the agricultural area.

In an embodiment, the applying logic is applying a model derived from system identification.

BRIEF DESCRIPTION OF DRAWINGS

An embodiment of the apparatus will now be described by way of example only with reference to the accompanying drawings in which:

FIG. 4 shows an enlarged view of a modified gate or regulator described with reference to FIG. 1;

DESCRIPTION OF EMBODIMENTS

The preferred embodiments relate to a water distribution system (or irrigation conveyance network) using spatially very large networks of open channel systems for supplying water. Apart from irrigation, the water distribution system may be utilized for industrial applications, and for the urban sector, for example. These conveyance systems largely operate under gravity in flat terrain and, as such, transport the water in a relatively slow way (compared to the near instantaneous response of a pressurised pipeline).

In the context of a river (or other at-least-predominantly-free-surface flow path) that is 500 km long, it can take days for an upstream influx (e.g. storm event) to propagate and result in higher water levels downstream. According to various existing methods, the propagating surplus can exceed the available freeboard resulting in overflow and wastage. It can also pass closed soil-supplying water-exits or gates en-route to the sea whereat it is also wasted.

The system is configured to avoid such wastage. By opening downstream soil-supplying water-exits or gates in anticipation of such a surplus the water levels within downstream portions of the flow path (from which the soil-supplying exits or gates convey water) can be lowered to make downstream freeboard available to capture the surplus.

Opening the exits or gates in anticipation of surplus effectively utilises the storage capacity of the soil. By also taking account the of the soil's available storage capacity, an optimal compromise between capturing surplus and over-watering can be achieved. The 'soil's available storage capacity' and similar terminology is used here as a reference to the difference between the soil's storage capacity (an inherent characteristic of the soil) and the soil's moisture level; that is as a reference to how much additional water the soil can store before being saturated. Likewise, a cost function associated with crop's need or tolerance for a water may be considered.

The water level (e.g. set point) in an upstream portion of the flow path may also be lowered in anticipation of an influx, e.g. in response to rain forecast in the catchment area or in response to temperature forecasts foreshadowing an influx of melt water.

Figure 1:
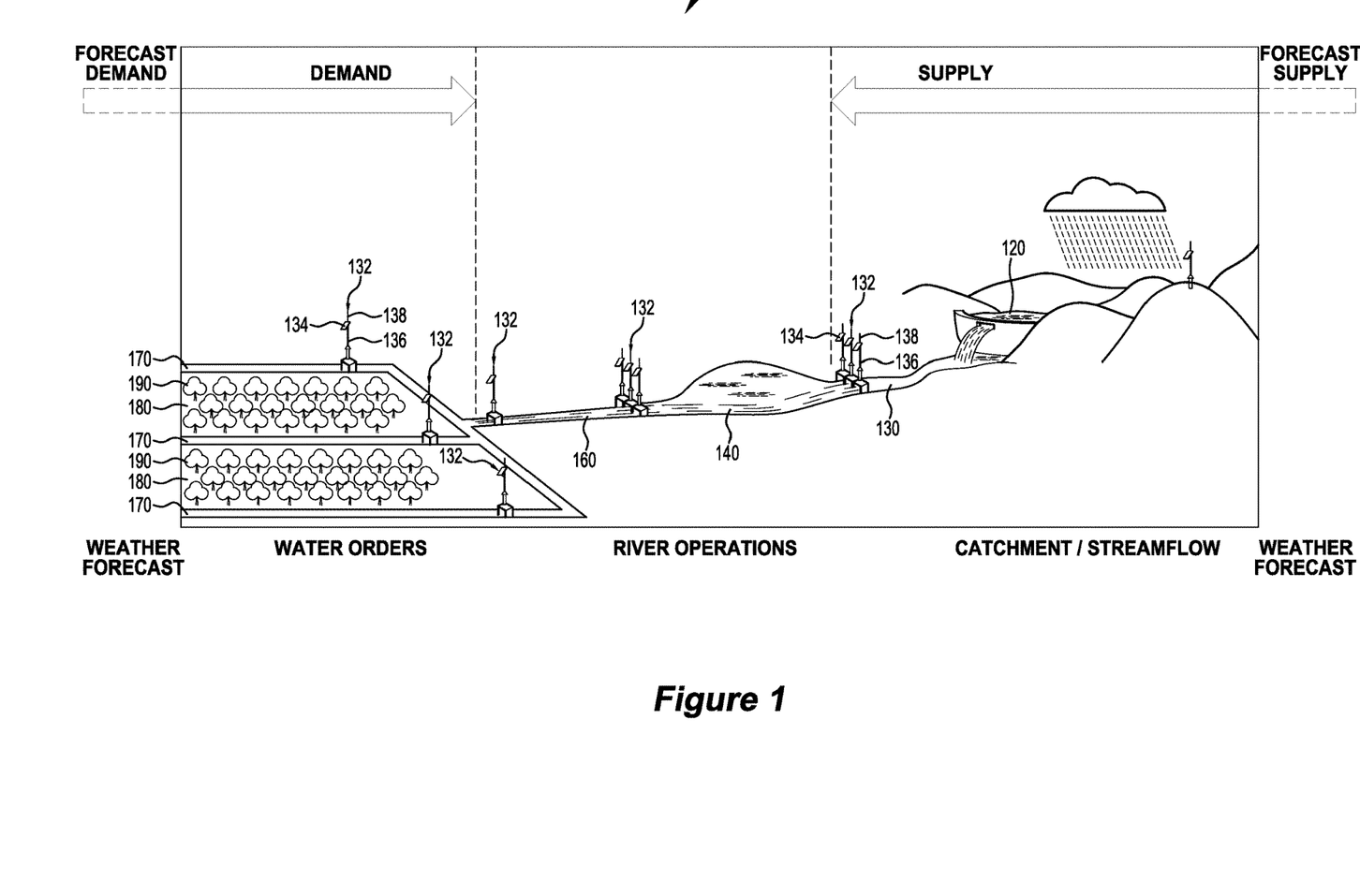
FIG. 1 shows a typical prior art water distribution or irrigation system in a simplified pictorial representation.

FIG. 1 is an extremely simplified pictorial representation of a water distribution system or irrigation conveyance network 100 that includes an upper catchment or dam 120 fed by rivers or creeks (not shown); natural carriers (e.g. rivers) 130 and canal pools 140; canals 160 that offtake from these natural carriers 130 and/or canal pools 140; and channels 170 for delivering water to the crops 190 on farms 180.

The system 100 distributes water to the crops 190 and farms 180 (e.g. in response to water orders and/or as part of a delivery schedule). Water is sequentially supplied from the upper catchment 120 through the rivers 130 and canal pools 140 and canals 160 to the farms 180. Water is delivered to the crops 190 and farms 180 based on one or more of a customer demand, an irrigation schedule, and the supply of water available in the distribution network 100.

Water flow is controlled by gates or regulators 132, typically, but not limited to, overshot gates. Examples of such gates or regulators 132 are shown in the Applicant's CONTROL GATES of PCT Application No. PCT/AU2001/001036 (published as WO2002/016698, the contents of which publication are incorporated herein by reference). The control of water in the rivers 130 and canal pools 140 can be regulated by a plurality of gates or regulators 132 as shown in FIG. 1 in view of the output therefrom. The Applicant's FLUID REGULATION of PCT Application No. PCT/AU2002/000230 (published as WO 2002/071163 A1, the contents of which publication are incorporated herein by reference) describe methods and systems for providing decision support for water delivery or the actual physical water delivery from the basin to the crops.

Each gate or regulator 132 is driven by an electric motor integrated into the structure thereof and powered by a rechargeable battery coupled to a solar cell 134 located on a pedestal 136. The pedestals 136 contain the required electronics and communication systems to enable each gate or regulator 132 to operate and data to be collected on the gate opening position and volume of water flowing through the gates or regulators 132. Data can be received and transmitted wirelessly using aerials 138 through radio or another telecommunication protocol to form a network with a remote computer system.

The water distribution system 100 provides an at least predominantly-free-surface flow path between the storage of the catchment 120 and the canals 160. As the terminology and similar technology are used herein:
open irrigation channels and/or rivers are examples of free-surface flow paths; and
a long open irrigation channel broken by a short piped-section under a roadway is an example of a predominantly-free-surface flow path.

Figure 2:
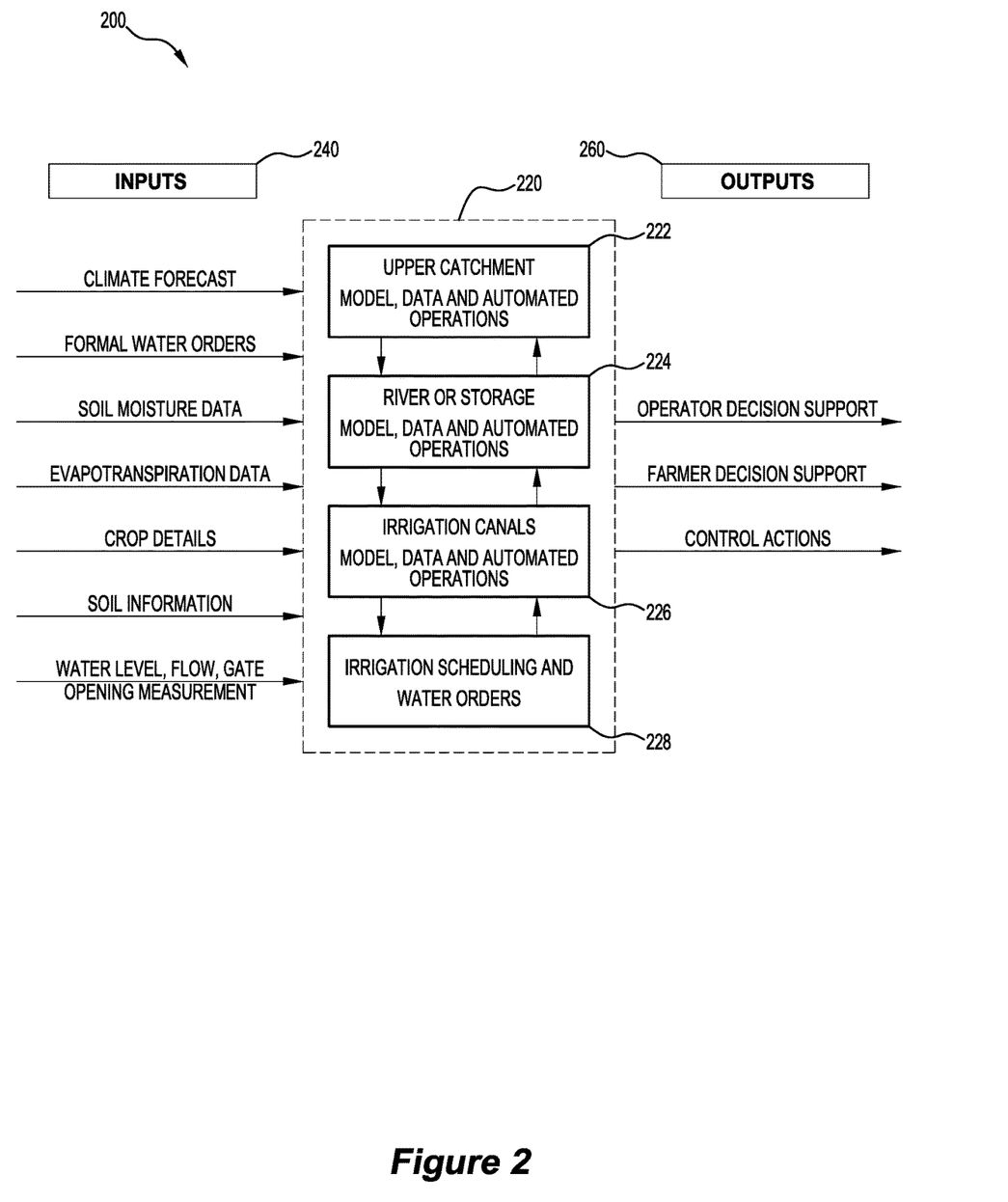
FIG. 2 shows a block diagram of an integrated catchment management system of the present invention.

Referring to FIG. 2, an integrated catchment management system 200 is provided. The integrated catchment management system 200 accounts for the spatial and temporal characteristics associated with the water distribution system 100 in order to match the supply in the water distribution system to the demand at the farm/crops 180. The integrated catchment management system 200 provides the ability to forecast and pre-empt both demand and supply conditions in order to provide better operational outcomes such as delivering water in a timely manner as required by the crop, with no (or minimal) water loss in the delivery. In addition, the integrated catchment management system considers (and takes advantage of) the supply of water when it is available. By matching the supply with the demand, the integrated catchment management system is able to reduce the occurrence of oversupply (wastage) of water or undersupply of water to the users.

The integrated catchment management system 200 includes a control arrangement, such as one or more computer processors, for receiving and processing information relating to the water distribution system 100. The one or more processors of the water distribution system are additionally configured to control the operation of the water distribution system or provide a report to an operator/farmer. The one or more processors may additionally implement learning algorithms and automation for managing the water distribution system. The integrated catchment management system is additionally provided with a communication module for communicating with the sensors and actuators distributed across the water distribution system 100. The communication module preferably supports wireless communication such as via radio transmission, Wi-Fi, Bluetooth, and/or any other IEEE 802.11 standard of communication.

Using data and models to represent the tiers in the demand-side and supply-side in the water distribution system, the integrated catchment management system 200 seeks to match the demand to the supply. By modelling and analysing each different tier of the water distribution system, the system 200 is able to forecast supply and demand conditions at either end of the water distribution system to provide optimal decisions and outcomes in meeting the operational objectives. Thereby, the integrated catchment management system 200 minimises the risk or oversupply or undersupply of water to the crops 190 and farms 180.

The integrated catchment management interconnects all the aspects and stakeholders from a crop root level to a broader basin level that uses real-time (e.g. at least daily or at least hourly) measurements and the real-time interflow of information and provides decision support for irrigation district and farmers and wherever there is infrastructure. In addition, the integrated catchment management is able to take autonomous control actions in order to match the supply to the demand.

The integrated catchment management 200 provides a water distribution model 220 consisting of the following sub-models to represent the different tiers of the water distribution system:
  model 222 for the upper catchment 120;
  model 224 for the natural carriers (e.g. rivers) 130 and storages 140;
  model 226 for the irrigation canals 160 and channels 170 that offtake from these natural carriers/storages.

The water distribution model 220 additionally includes delivery schedule 228 relating to irrigation scheduling and water orders that are placed against the crops/farms. The integrated catchment management system 200 may influence the delivery schedule by prompting (or otherwise providing decision support to) farmers (or other water recipients). Alternatively, the schedule may be implemented by adjusting a water pricing model. Other variants of the integrated catchment management system 200 may simply automatically vary delivery times.

The integrated catchment management system 200 spans from catchment to crops/farms and considers spatial and temporal changes along the flow path, which are inputs 240 to the system model 220, in order to optimally match demand and supply across an entire catchment while preventing water losses. The inputs 240 to the supply of, and demand for water. The inputs 240 may include:
  1. Climate forecast
  2. Formal water orders
  3. Soil moisture data
  4. Evapotranspiration (ET) data
  5. Crop details
  6. Soil information
  7. Water level, flow and gate opening measurements at a farm level to catchment level Based on these inputs 240 the integrated catchment management 200 provides outputs 260 to coordinate and operate field equipment autonomously to operate the entire water distribution system from catchment to each crop/farm to optimally match the demand (downstream) and supply (upstream) both spatially and temporally. The field equipment includes a gate and/or pump in the water distribution system for example. The autonomous action may include one or more of:
  controlling a supply of water to the flow path to the flow path (e.g. by releasing water from a dam 120 or other upstream water store 130, 140, 160);
  controlling the delivery of water to the soil to utilize a capacity of the soil to accept water in response to a surplus of water and/or in anticipation of surplus water to the water distribution system (e.g. by opening exits or gates from the flow-path); and
  reducing a volume of water in a pool 140 by control gates to free up storage capacity in order to capture surplus water (e.g. by controlling the exits or gates from the flow path).

The exits or gates may be valves at the downstream ends of the canals 160.

Further the integrated catchment management 200 provides an output in the form of decision support to an operator (or farmer) to assist in operating the entire water distribution system from catchment to each farm optimally to match the demand (downstream) and supply (upstream) both spatially and temporally.

The integrated nature of the catchment management 200 (which considers multiple inputs along the water distribution system and provides one or more outputs for controlling the water distribution system) matches supply with the demand and, as a result, increases the overall efficiencies of the water distribution system.

Reliance on irrigation orders to predict demand works well in a tightly controlled water distribution system that can respond instantly and locally to this demand. Having 'forward look' forecast information on demand through such tools as soil moisture, demand patterns (irrigation practices) or weather forecasts allows operational actions to be taken that will pre-empt likely conditions that are to occur. In an operational sense, actions can be taken that take advantage of the 'elasticity' or 'give & take' in the system rather than only relying on actual events. This elasticity is usually associated with the inherent storage in the systems, whether with the channels themselves or storage facilities such as dams or weirs on the conveyance network. By using forecast data, pre-emptive operational actions can be taken to surcharge or drawdown the storage in the system to better respond to forecast events. The probability of forecasts and risk associated with actions are key parameters in these models proposed for catchment management.

The system continuously monitors the data and ensures that transportation delays and capacities in the conveyance systems, and storages on farm and in the root zone of crops are utilized to buffer and mismatches in prediction and reality, and continuously optimizes its prediction through learning algorithms.

The flow path of the water distribution system to which the integrated catchment management 200 is applied can have a length up to about 100 km. It is limited by the resolution of the weather and soil moisture measurements, satellite images and evapotranspiration data. As the resolution increases, or with more instrumentation to measure the evapotranspiration, rain and drought events and soil moisture, so does the capability of the tool to operate on smaller catchments and farms. The weather forecasts can be integrated into the system to provide additional derived advance notice of the demand over and above that computed from the water orders as depicted in FIG. 1.

Determining the Water Level, Flow and Gate Opening Measurements

The inputs relating to the water level, flow and gate opening measurements may be provided by one or more supply indicators. The supply indicator is a flow meter or a level sensor for example. The supply indicators may provide information relating to:

at least one volume of water in the water distribution system; or inflow of water to the water distribution system; or future inflow of water to the system.

In the example previously described above, in the event of a rainfall (or forecasted rainfall event), the supply indicator (s) will provide an indication of one or more of the volume of water in the upstream portion, the inflow of water to the upstream portion, and the forecasted inflow of water in the upstream portion.

Based on the indication of the current water levels at and current/forecasted inflow into the upstream portion, the water distribution system is operated to release water in the upstream portion to one or more downstream portions, if necessary, in order to allow the upstream portion to accommodate the additional inflow of water.

Determining the Soil Moisture

To the inventors' knowledge, there are no approaches currently to accurately extrapolate localised accurate local measurements of moisture on a spatial scale.

There are moisture sensors that can measure the moisture level in the soil near the root zone of the plant which can indicate when water should be applied to the plant. These sensors however only provide a point, or localized, measurement of the moisture in the soil for a larger crop plantation. There can be wide spatial variability associated with soil moisture because there are several factors that make the measurement of moisture in the soil specific to that site, such as;

1. Soil type, specifically its water holding capacity
2. Crop type
3. Crop condition and that stage the plants growth cycle
4. Micro-climate The cost of these sensors and communicating their associated data precludes a large distribution of these instruments being deployed across a crop plantation.

There are sensors (instruments) that can measure these parameters on the required necessary spatial density to give a more cost-effective derivation of moisture in the soil for a wider scale crop plantation. This method can also be costly for the overall level of accuracy it provides.

Existing approaches to determine the soil moisture deficit through satellite imagery and Normalized Difference Vegetation Index (NDVI) cannot provide guarantees on accuracy of the moisture deficit as the equations to derive the deficit through evapotranspiration (ET) approaches rely on empirical equations that are calibrated around a certain data set, and there are lot of approximations involved in the computation of ET.

Computation of the crop Evapotranspiration $E_{TC}$ is discussed below to highlight its deficiencies.

$$\text{Crop co-efficient}(Kc) = f(\text{NDVI}) \rightarrow (1)$$

$$E_{TC} = E_{TO} \cdot Kc \rightarrow (2)$$

where $E_{TC}$=EvapoTranspiration at the desired sur face
$E_{TO}$=Reference crop EvapoTranspiration The reference crop evapotranspiration $E_{TO}$ can be calculated using the following equation known as the Penman-Monteith equation:

$$\tau E_{TO} = \frac{[\Delta(Rn - G)] + (\gamma \tau Ea)}{(\Delta + \tau)}$$

where
$\Delta$=Slope of the saturated vapour pressure curve $$\left[\frac{\delta e}{\delta T}\right]$$

e=saturated vapour pressure (kPa)
T=daily mean temperature (° C.)
Rn=net radiation flux (Mjm$^{-2}$d$^{-1}$)
G=sensible heat flux in to the soil (Mjm$^{-2}$d$^{-1}$)
$\gamma$=psychometric constant (kPa ° C.$^{-1}$)
$\tau$=Latent heat of vapourization (Mj/Kg)
Ea=vapour transport of flux (mm d$^{-1}$)

The equation is deficient for the following reasons:

the daily mean temperature T is the average of the maximum and minimum temperatures ((Tmax+Tmin)/2). However, this information does not capture the accurate spread of temperature variations in a day.

wind speed measurements at 2 m above ground level is required. Readings at heights other than 2 m are usually adjusted using empirical equations.

the slope of the saturated vapour pressure curve also uses the daily mean temperature T.

the psychometric constant $\gamma$ requires atmospheric pressure as an input. The atmospheric pressure at an elevation is measured using an empirical formula assuming a temperature of 20° C. which is not always true. For at least these reasons, the set accuracy of an Et estimated (and hence soil moisture deficit) through a satellite and weather measurements cannot be guaranteed. Irrigation administrative regions usually span over a large area (for e.g. 27,000 sq·km). Therefore, cumulative inaccuracy on both a spatial a temporal scale on the estimation of soil moisture can result in huge supply and demand mismatches that cannot be buffered within the system, thereby either creating wastages due to excess supply, or starving the farms through inadequate supply.

Figure 3:
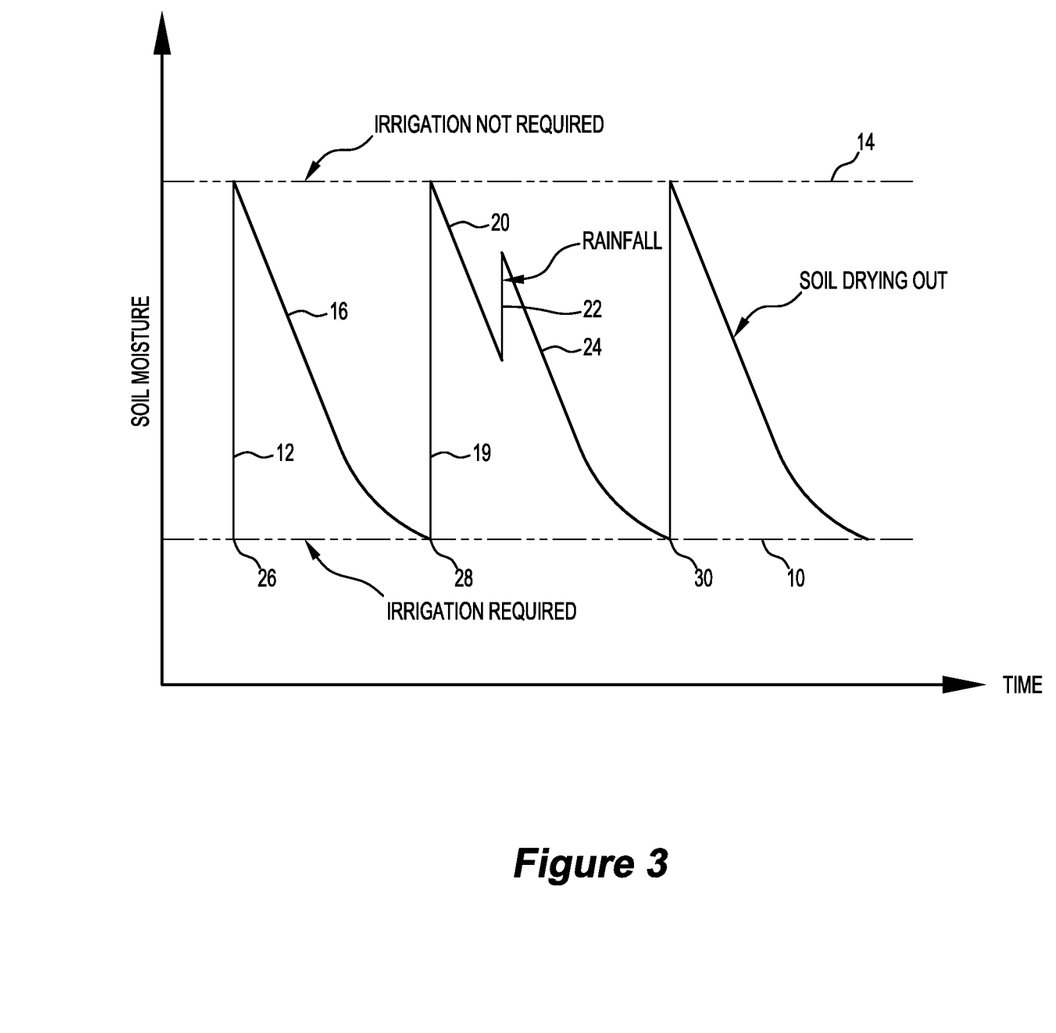
FIG. 3 shows a graph of soil moisture against time in a sample timeline.

The importance of determination of soil moisture and the ongoing effects it has on crops is shown in FIG. 3. FIG. 3 shows a graph of soil moisture against time in a sample timeline. At moisture level 10, the soil is drier enough to require irrigation to provide a healthy crop. Irrigation proceeds at line 12 and is stopped when the soil moisture reaches moisture level 14, where irrigation is no longer required. Assuming there is no rain, the soil will dry out as shown by gradient 16. The soil moisture will fall to moisture level 10 and irrigation will be required again. Irrigation again proceeds at line 18 and is stopped when the soil moisture again reaches moisture level 14, where irrigation is no longer required. The soil will dry out as shown by gradient 20. If rainfall occurs as shown by line 22, the soil moisture will increase. On cessation of rainfall, the soil will again dry out as shown by gradient 24. Accordingly, there is a longer time between irrigation cycle 28, 30 than the irrigation cycle 26, 28. If this variation is not taken into consideration when requesting irrigation of crops, the soil will be overwatered resulting in unnecessary irrigation of crops and wastage of water.

To address the deficiencies identified above and previously, the method of determining the moisture levels in the soil on a spatial scale in an irrigation area must be improved. The method of the present invention is an improvement over the Applicant's DEMAND MANAGEMENT SYSTEM FOR FLUID NETWORKS of PCT Application No. PCT/AU2012/000907 (published as WO 2013/016769 A1, the contents of which publication are incorporated herein by reference), and the Applicant's METHOD OF DEMAND MANAGEMENT AND CONTROL OF FLUID PIPE NETWORKS of PCT Application No. PCT/AU2014/050208 (published as WO 2015/031954 A1, the contents of which publication are incorporated herein by reference).

The moisture level is determined based on data indicative of one or more of the parameters set out below.

Air temperature (e.g. air temperature at at least two points at least proximal the agricultural area). The temperature data can be obtained using temperature sensors on equipment deployed as part of the irrigation control system.

Rainfall (e.g. rainfall at at least two points at least proximal the agricultural area). The rainfall data can be obtained using rainfall sensors incorporating the necessary density of rainfall sensors on equipment deployed as part of the irrigation control system. Rainfall has strong spatial variability (i.e. in a given area, the rainfall is not uniform spatially).

Wind speed (e.g. wind speed at at least two points at least proximal the agricultural area). The wind speed data can be obtained using wind speed sensors on the equipment deployed as part of the irrigation control system. Wind speed has medium spatial variability.

Relative humidity (e.g. relative humidity at at least two points at least proximal the agricultural area). The relative humidity data can be obtained by incorporating the necessary density of rainfall sensors on the equipment deployed as part of the irrigation control system. Relative humidity has low spatial variability Barometric pressure at at least two points at least proximal the agricultural area).

Proximal solar intensity. The solar intensity can be determined from an output of a solar panel (i.e. as an energy measurement) deployed as part of the irrigation control system.

An inherent characteristic of the soil including soil types and water holding capacity (e.g. inherent characteristic of the soil at at least two points at least proximal the agricultural area). Soil type can be determined by ground penetrating radar to develop a relationship between the radar signal and the water holding capacity of the soil;

An irrigation history associated with the agricultural area (e.g. history relating to each irrigation supplied to a farm—how much water was supplied, when was the water supplied, was the soil moisture a maximum or saturated following the supply of water).

Satellite data (e.g. an energy density for visible light or an energy density for near-infrared light). The satellite data can provide spatially variable measurements of the intensity (W/m$^2$) of solar radiation spectrums for visible light (having wavelengths of 0.4 µm to 0.7 µm) and near-infrared light (having wavelengths of 0.7 µm to 1.1 µm).

Figure 5:
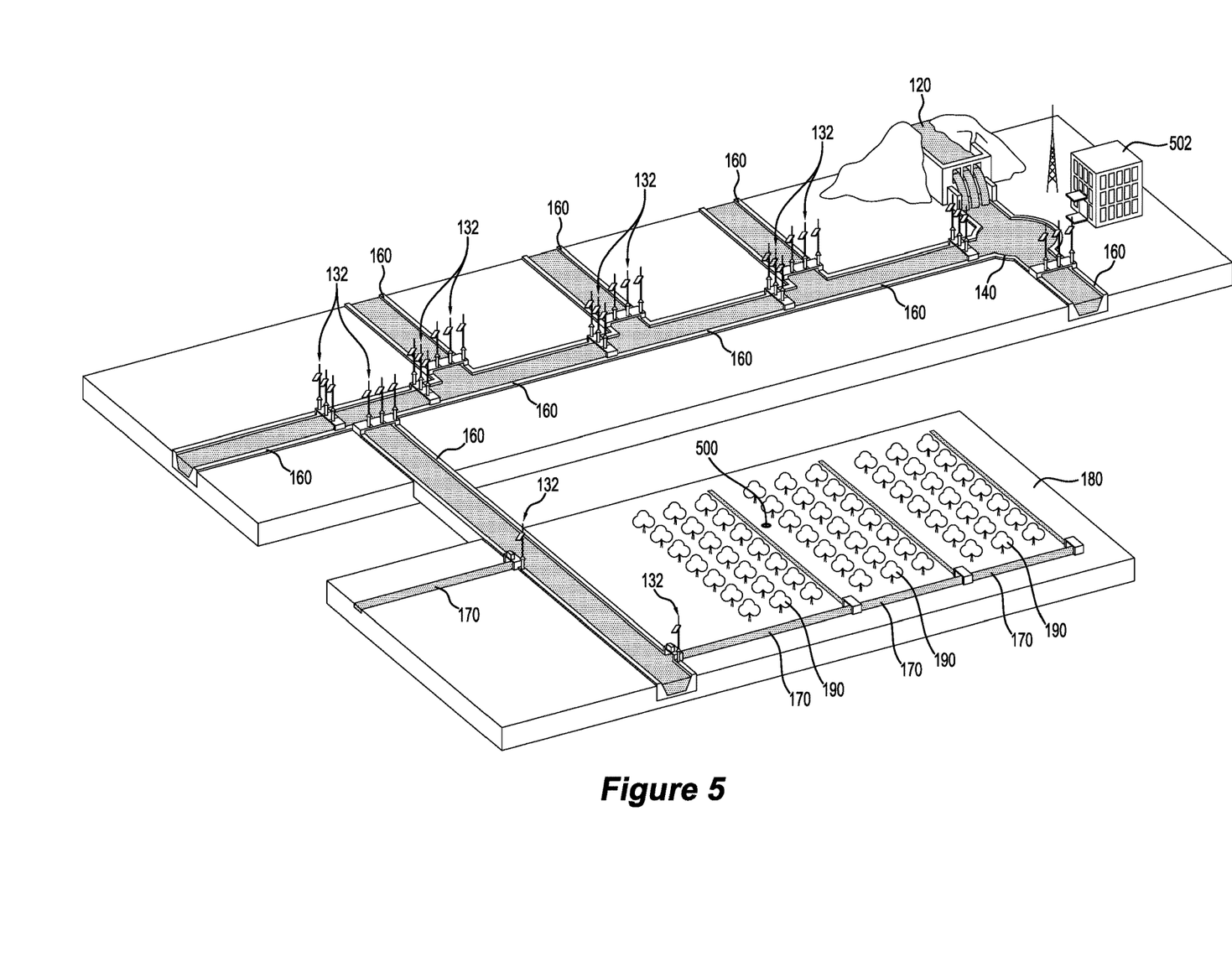
FIG. 5 shows an embodiment of a water distribution or irrigation system in a simplified pictorial representation.

FIG. 4 shows an enlarged view of a modified gate or regulator 132 described with reference to FIG. 1. A remote computer system 150 is depicted by a laptop that communicates with all gates or regulators 132 and moisture sensors 500 (FIG. 5). A weather station 152 is fitted to pedestal 136 and is powered through solar panel 134 at each location. Suitable weather stations 152 are available which can provide measurements of temperature, rainfall, wind speed, relative humidity, weather forecast and UV. Weather stations 152 can be readily incorporated in the design of gates or regulators 132 or can be retrofitted to already existing gates or regulators 132. The network of weather stations enhances the measurement and prediction of weather forecasts for meteorologists and farmers. The network provides the concept of a network of weather stations used individually by farmers but part of a wider shared network through the concept of a cluster of networked weather stations. This is achieved through the ability to interpolate the information on the network of weather stations.

Some of the sensors described above may be in the agricultural area.

The data may, for example, be received from a photovoltaic powering a water control barrier or gate, a pump, a flow meter and a water level sensor or any electromechanical device.

FIG. 5 is a similar view to that of FIG. 1 and the same reference numerals have been used to avoid duplication of description. Each gate or regulator 132 or group of gates or regulators 132 includes a weather station 152 (FIG. 4) linked to a remote computer system depicted at 502. A soil moisture sensor 500 is positioned amongst the crops 190. The soil moisture sensor 500 is wired or wirelessly linked to the computer network with the gates and regulators 132 and the weather stations 152. The soil moisture sensors 500 are spread throughout the irrigation district and are substantially less in number than the gates or regulators 132. Suitable soil moisture sensors are sold under the trade marks AQUASPY or SENTEK.

In determining the moisture data, the method includes determining and applying a model having parameters adjusted to suit the agricultural area.

In applying the logic, the method (additionally/alternatively) includes applying a model derived from system identification. System Identification techniques are used to produce an algorithm that derives evapotranspiration on a spatially variable scale that can be used to determine the moisture in the soil on the same spatially variable scale. Calibration of the algorithm will be achieved by the direct measurement of the moisture in the soil using sensors 500 distributed throughout the irrigation area and providing good representation of spatial variability of the input data.

The spatial density of the measurement will be dependent of the spatial variability of the specific input parameters. Point source measurements, e.g. soil moisture, can be used to ground truth or calibrate measurements from satellites that provide high spatial variability but do not have high accuracy levels.

There are two methods of determining/deriving the soil moisture on a continuous/contour basis for an area of land:
1. Derive soil moisture from a selection of the raw inputs (rainfall, temperature, humidity, solar radiation, wind speed, crop factor, soil type, barometric pressure, irrigation historical data and energy from solar panels) for each individual weather station 152 and then interpolate soil moisture based on the fact that weather stations 152 are on a grid network (density, spacing etc.) that provides a good spatial representation of the soil moisture.
2. First interpolate the raw inputs based on the grid network of weather stations 152 (plus satellite spatial determination of crop factor) and then compute the spatial soil moisture.

This information will also be used as an aid to irrigation farmers in determining the best time to irrigate their crop.

Software tools will prompt irrigators on a real-time basis on any changes to the suggested time to irrigate. The system will be integrated with the water ordering software of the Applicant's DEMAND MANAGEMENT SYSTEM FOR FLUID NETWORKS of PCT Application No. PCT/AU2012/000907 (published as WO 2013/016769 A1, the contents of which publication are incorporated herein by reference) to facilitate efficient irrigation practices and the ease of use of the system.

$$\text{Soil moisture at } (x, y, t) = \text{Soilmoisturereferencestations}\begin{pmatrix} x1 & y1 \\ \vdots & \vdots \\ xn & yn \end{pmatrix}, t \bigg].$$

$f$(Solar radiation, satellite data, soil type, rainfall, wind speed, irrigation historical data, temperature & humidity, $t$)

where
x and y=geographical co-ordinates
t=time

The parameters of the function $f$ will be calibrated and validated using real time accurate data collected using field instrumentation located in the irrigation area.

Soil moisture at other areas in the farm can be determined by extrapolating the soil moisture measurements made any other point at the farm. In extrapolating the data, the method also considers one or more of soil types, crop types, crop growth stages, and satellite measurements between the point at which the measurement is made and the point at which soil moisture is to be determined.

Determining Evapotranspiration

Referring to FIG. 4, the present invention provides a system 300 and method for estimating evapotranspiration (ET) data using indirect measurements available in remote areas. In particular, the present invention makes use of an output of the array of solar panels 134 used to power existing devices used throughout the water distribution system, such as gate or regulator 340. The solar powered devices may also include a range of devices including sensors (such as the sensors 500 previously discussed for determining soil moisture), a water control barrier, a pump, a flow meter, a water level sensor, and any electromechanical device used in the water delivery system.

Existing methods of determining ET are based on satellite measurements. Because the measurements in this invention are made closer to the farm, the method of the present invention is more accurate than the existing methods of determining ET.

Solar powered devices are becoming more prevalent in the agriculture and irrigation sector. These solar powered devices provide immense an opportunity to utilize the solar data for other useful purposes including estimating the ET.

Solar cells convert energy from the photons in sunlight to the electrons in the solar cell. The more photons of sunlight absorbed by the solar cell, the greater the current output.

Current output of the photovoltaic cell ∝ Solar intensity

However,

EvapoTranspiration ∝ Solar intentsity

Therefore,

EvapoTranspiration ∝ Current output of the Photovoltaic cell

A number of other factors can be considered to improve the ET calculation including the age of the photovoltaic cell, the temperature, the crop type and growth stage, the soil type, irrigation events, wind information. Hence, the ET can be determined from the following equation:

$$EvapoTranspiratio(t) = f \begin{pmatrix} \text{Current output of the photovoltaic cell} \\ \text{Age of the photovoltaic cell,} \\ \text{Temperature,} \\ \text{Crop type \& growth stage,} \\ \text{Soil type,} \\ \text{Irrigation events,} \\ \text{Wind information} \\ t \end{pmatrix}$$

where
t=time

The parameters of the function $f$ will be calibrated through real time data from photovoltaic cells in the field as well as other inputs on temperature, crop type and its growth stage and soil type.

Example 1

Figure 6:
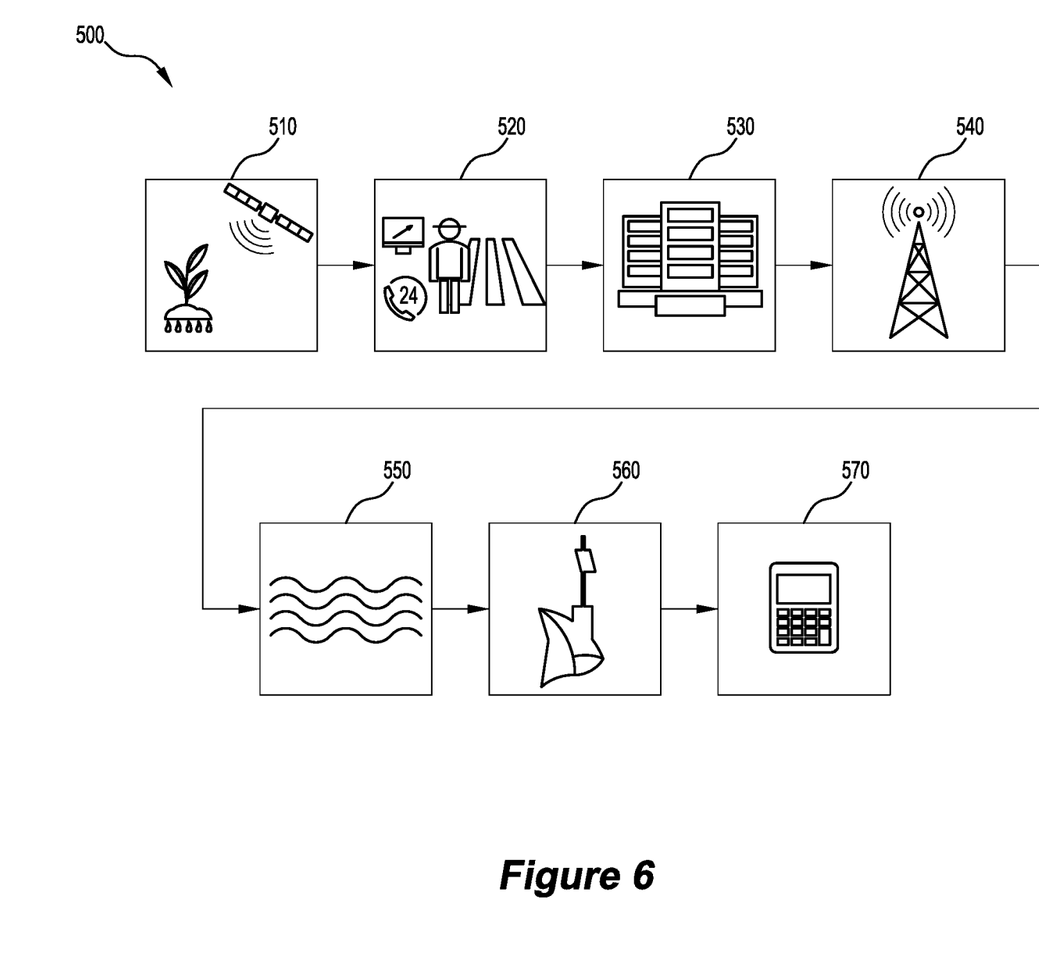
FIG. 6 shows an automated supply process for irrigated water supply.

An example operation of the network catchment management of the present invention will now be described with reference to FIG. 6. The integrated catchment management system of the present invention provides an optimal convergence of supply and demand, and judicial utilization of the elasticity/buffer within the system.

At step 510, the integrated catchment management system uses satellite evapotranspiration data and/or farm soil moisture data predicted by extrapolating the soil moisture measurements made at any other point at the farm to:
  predict the optimal date of a farm's next irrigation;
    optionally inform the customer of the optimal date (by text message or email); and
    predict future inflows in a water basin and storage based on weather data and live measurements of flows and water levels.

The system then establishes the demand and to establish the supply in both space and time; and ensures that the water demand is within the supply constraints. In this example, the 'demand' is the water requirement at the farm level, and the 'supply' is the water availability in the basin. At step 520, the system receives a request from a customer for irrigation water, which is then managed on a water authority's server.

At step 530, if capacity in the canal network is available at the requested time and the customer has sufficient water in their water bank account, the order is automatically accepted. If the capacity is insufficient, the system will offer an alternative time to the customer. The system will also continuously measure the storages in the water distribution system (pools), offline storage, and crops root zone in anticipation of a flood or a shortfall.

At step 540, the system identifies the cross-regulators and the farm service point needed to deliver the order. In addition, the system identifies the pools or farms with the spare storage. Radio node towers receive this information and send instructions to the appropriate automated gate cross-regulators and to the customer's service point.

The Applicant's DEMAND MANAGEMENT SYSTEM FOR FLUID NETWORKS of PCT Application No. PCT/AU2012/000907 (published as WO 2013/016769 A1, the contents of which publication are incorporated herein by reference), and the Applicant's METHOD OF DEMAND MANAGEMENT AND CONTROL OF FLUID PIPE NETWORKS of PCT Application No. PCT/AU2014/050208 (published as WO 2015/031954 A1, the contents of which publication are incorporated herein by reference) describe methods and system for ensuring that the demand does not exceed the supply, and that any violations (i.e. demands that exceed the supply constraints) are appropriately rescheduled as per business rules that suites operations of each irrigation region, which can be used with embodiments of the present invention.

The system then ensures that water is transported from its source to its destination points at high efficiency (i.e. with minimal water losses and/or at a steady flow rate). At step 550, the system automatically pre-empts the cross-regulator in the canal and adjust the pool setpoints to buffer any mismatches in supply from the water source. The system will lower the pool setpoints to create extra storage in anticipation of excess inflow (or floods). Alternatively, the system will surcharge the pools within constraints in the event of a short fall prediction. The customer's farm service point will normally automatically open at the scheduled time, deliver the requested flow rate for the duration of the order and then automatically close. In the event of a known prediction of a known excess inflow or shortfall, the operator/farmer will be allowed to move his order to start early or to delay his order to create a buffer in the water distribution system and storages.

At step 560, the automated gates along the water distribution system immediately adjust their flow rate to:
 take the pools to its new set point;
 replenish the water being withdrawn by the customer's and all other concurrent orders;
 maintain constant water levels at its new setpoint irrespective of flow changes.

At step 570, when irrigation is complete, the software uses service point meter and order information to calculate the amount of water supplied to the customer and deducts it from the customer's water bank account. The customer is automatically invoiced and optionally issued a statement. When the flood or shortfall event is completed, the system provides automatic commands to the cross-regulators to take their respective pools to the normal setpoints.

The Applicant's FLUID REGULATION of PCT Application No. PCT/AU2002/000230 (published as WO 2002/071163 A1, the contents of which publication are incorporated herein by reference) Patent No 2011903084, and the Applicant's SUPERVISORY CONTROL OF AUTOMATED IRRIGATION CHANNELS of PCT Application No. PCT/AU2013/000355 (published as WO 2013/149304 A1, the contents of which publication are incorporated herein by reference) describe methods and systems for providing decision support for water delivery or the actual physical water delivery from the basin to the crops.

As a holistic view of the network and its real-time status is available, the transportation delays, spare capacities in the conveyance systems, and storages on farm and in the root zone of crops can be exploited to buffer mismatches in prediction and reality. Thereby the system is able to mitigate the impact of extreme events such as floods and flow shortfalls.

Knowing in advance when all farmers will irrigate is also an important input for the integrated catchment management system and the ability to pre-empt demand in order to enact an optimal control strategy for the water network within the catchment.

The localised accurate readings are extrapolated spatially through characterised equations that is a function of the soil types (specifically its water holding capacity), crop type, crop condition and stage of plants growth cycle, weather information (wind, temperature, saturated vapour pressure), and satellite measurements.

The timing of when to apply water to a crop is a key decision process within irrigation farming practices. Determining when the crop needs to be replenished can impact on the resultant yield from the planted crop as well as the total amount of water used.

The invention differs from the prior art as it discloses methods and systems where the interpolation or derivation of data is based on a substantial reduction of expensive soil moisture sensors. The determination of soil moisture at any location within the irrigation district can be made without requiring a soil moisture sensor at that location. The soil moisture sensors are used to provide ongoing refinement and calibration of the system deriving soil moisture using climatic data.

Embodiments of the invention have been described above by way of non-limiting example only. Variations and modifications to the embodiments may be made without departing from the scope of the invention.

The claims defining the invention are as follows:

1. A method of spatially deriving soil moisture at a selected location within an irrigation district to be irrigated and irrigating predetermined areas within the irrigation district, said method comprising:
 using system identification techniques to produce an algorithm for evapotranspiration based on at least one of the following measured parameters: solar radiation spectrum, wind speed, temperature, humidity, crop factor, soil type, barometric pressure, irrigation historical data, and energy measurement from solar panels at each of a plurality of representative locations;
 calibrating said algorithm by direct measurement of the moisture in the soil at each of said representative locations by respective soil moisture sensors;
 using measured parameters of rainfall, soil type, irrigation historical data and crop factor in combination with said algorithm to derive or interpolate soil moisture at said selected location within said irrigation district; and
 irrigating the predetermined areas of said irrigation district with an irrigation management system based on the derived or interpolated soil moisture for said predetermined areas an availability of irrigation water, and requests for timed irrigation from end users.

2. The method of claim 1, wherein said soil type is determined by ground penetrating radar to develop a relationship between the radar signal and a water holding capacity of the soil.

3. The method of claim 1, wherein said irrigation historical data is based on time and volume of the irrigation to provide saturation data on said soil moisture.

4. The method of claim 1, wherein said solar radiation spectrum includes visible light and near-infrared light.

5. The method of claim 1, comprising said irrigation management system monitoring an irrigation conveyance network from catchments to supply water to areas to be irrigated under demand by said end users.

6. The method of claim 1, comprising said irrigation management system monitoring said soil moisture at said plurality of representative locations and monitors at least one or more of climate forecast, water orders from end users, crop details, water levels, and flow gate opening measurements of said irrigation district.

7. The method of claim 1, wherein the availability of irrigation water corresponds to water that is available from at least one at-least-predominantly-free-surface flow-path and is deliverable to soil, the availability of irrigation water includes at least one supply indicator of the water, the at least one supply indicator being an indicator of at least one of a volume of the water, an inflow of the water, and a future inflow of the water.

8. The method of claim 1, wherein:
the algorithm is produced based on the energy measurement from the solar panels at each of the plurality of representative locations; and
at least one of the solar panels powers an electromechanical device selected from the group consisting of a water control barrier, a pump, a flow meter and a water level sensor.

9. An apparatus comprising:
a soil moisture determination system to spatially derive soil moisture at a selected location within an irrigation district to be irrigated, said s soil moisture determination system comprising:
a networked computer system connected to a plurality of weather stations within said irrigation district, wherein the networked computer system is configured and arranged- to:
measure a selection from: solar radiation spectrum, wind speed, rainfall, temperature, humidity, barometric pressure, and energy measurement from solar panels at each of a plurality of representative locations, said networked computer system having data access to crop factor, soil type, and irrigation historical data at said representative locations;
use system identification techniques to produce an algorithm for evapotranspiration based on a predetermined selection from the weather station measurements and the data access to crop factor, soil type, and irrigation historical data at said representative locations;
calibrate said algorithm by direct measurement of the moisture in the soil at each of said representative locations by respective soil moisture sensors;
use measured parameters of rainfall, soil type, irrigation historical data and crop factor in combination with said algorithm to derive or interpolate soil moisture at said selected location within said irrigation district; and
an irrigation management system configured to irrigate predetermined areas of said irrigation district based on the derived or interpolated soil moisture for said predetermined areas, an availability of irrigation water, and requests for timed irrigation from end users.

10. The apparatus of claim 9, wherein said soil type is determined by ground penetrating radar to develop a relationship between the radar signal and water holding capacity of the soil.

11. The apparatus of claim 9, wherein said irrigation historical data is based on time and volume of the irrigation to provide saturation data on said soil moisture.

12. The apparatus of claim 9, wherein said solar radiation spectrum includes visible light and near-infrared light.

13. The apparatus of claim 9, wherein said irrigation management system is configured to monitor an irrigation conveyance network from catchments to supply water to areas to be irrigated under demand by said end users.

14. The apparatus of claim 9, wherein said irrigation management system is configured to monitor said soil moisture at said plurality of representative locations and monitor at least one or more of climate forecast, water orders from end users, crop details, water levels, and flow gate opening measurements of said irrigation district.

15. The irrigation management system of claim 14 wherein said weather stations are included with a plurality of said flow gates.

16. The apparatus of claim 9, wherein:
the networked computer system is configured to perform the energy measurement from the solar panels at each of the plurality of representative locations; and
at least one of the solar panels powers an electromechanical device selected from the group consisting of a water control barrier, a pump, a flow meter and a water level sensor.

17. A method of controlling a water distribution system, the system having at least one at-least-predominantly-free-surface flow-path from which water is deliverable to soil, the method comprising:
spatially deriving soil moisture at a selected location within an irrigation district to be irrigated comprising:
using system identification techniques to produce an algorithm for evapotranspiration based on at least one of the following measured parameters: solar radiation spectrum, wind speed, temperature, humidity, crop factor, soil type, barometric pressure, irrigation historical data, and energy measurement from solar panels at each of a plurality of representative locations;
calibrating said algorithm by direct measurement of the moisture in the soil at each of said representative locations by respective soil moisture sensors;
using measured parameters of rainfall, soil type, irrigation historical data and crop factor in combination with said algorithm to derive or interpolate soil moisture at said selected location within said irrigation district; and
irrigating the predetermined areas of said irrigation district with an irrigation management system using the water based on the derived or interpolated soil moisture for said predetermined areas, an availability of water, and requests for timed irrigation from end users,
wherein
the availability of water includes at least one supply indicator, the at least one supply indicator being an indicator of at least one of at least one volume of water in the system, an inflow of water to the system, and a future inflow of water to the system.

18. The method of claim 17 wherein the irrigating includes causing the water to be delivered to the soil to utilize a capacity of the soil to accept the water in response to at least one of a surplus of the water or in anticipation of a surplus of the water.

19. The method of claim 18 wherein the system includes a system portion from which the water is so delivered; and the method includes reducing a volume of the water in the system portion to make storage capacity within the system portion available to capture surplus water.

20. The method of claim 17 wherein the at least one supply indicator includes an indicator of at least one of:
   at least one volume of water in the system upstream of the flow path;
   an inflow of water to the system upstream of the flow path; and
   a future inflow of water to the system upstream of the flow path.

21. The method of claim 17 wherein the irrigating includes controlling a supply of water to the flow path.

* * * * *